Feb. 5, 1957 A. E. NOBLE ET AL 2,780,096
FLOW TESTER FOR PLASTIC MATERIALS
Filed July 1, 1954 2 Sheets-Sheet 2
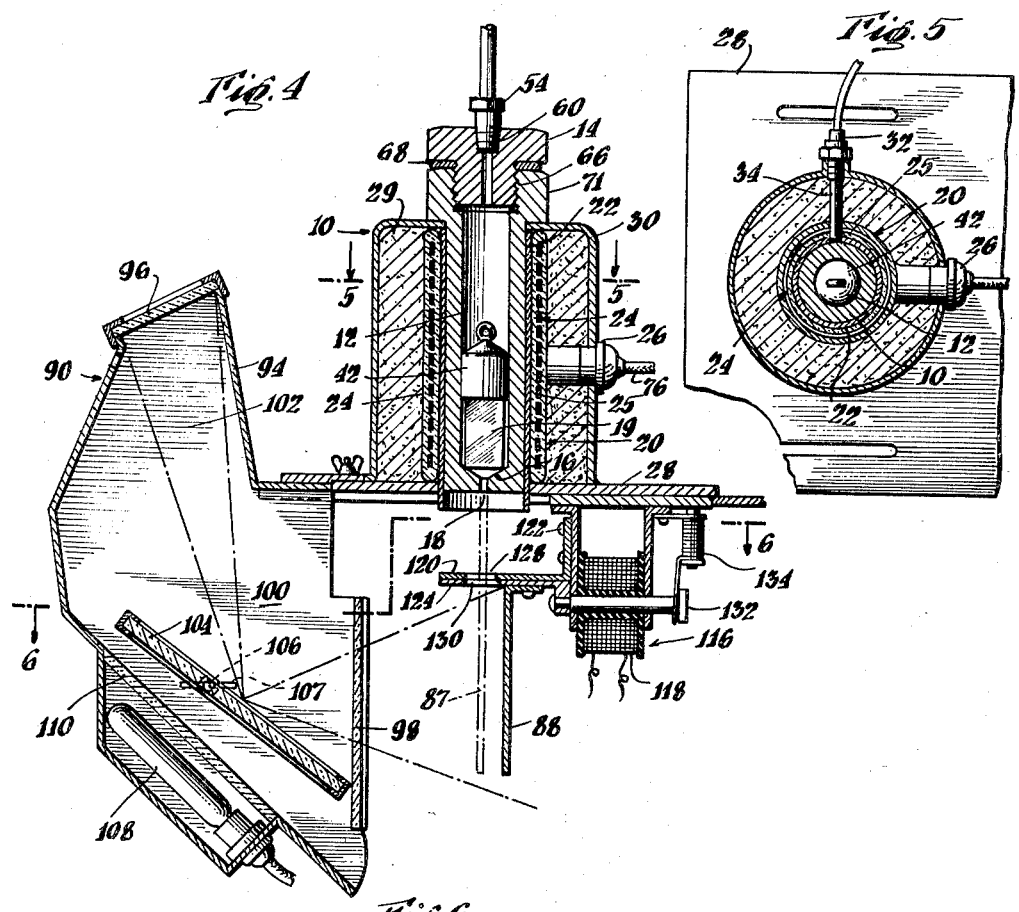
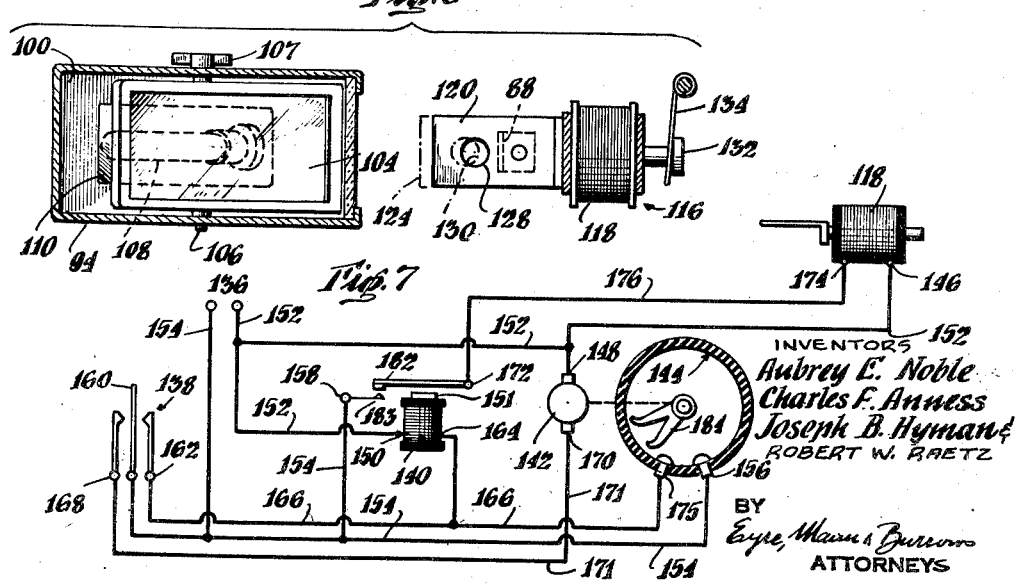
INVENTORS
Aubrey E. Noble
Charles F. Anness
Joseph B. Hyman &
Robert W. Raetz
BY
Eyre, Mann & Burrows
ATTORNEYS

United States Patent Office 2,780,096
Patented Feb. 5, 1957

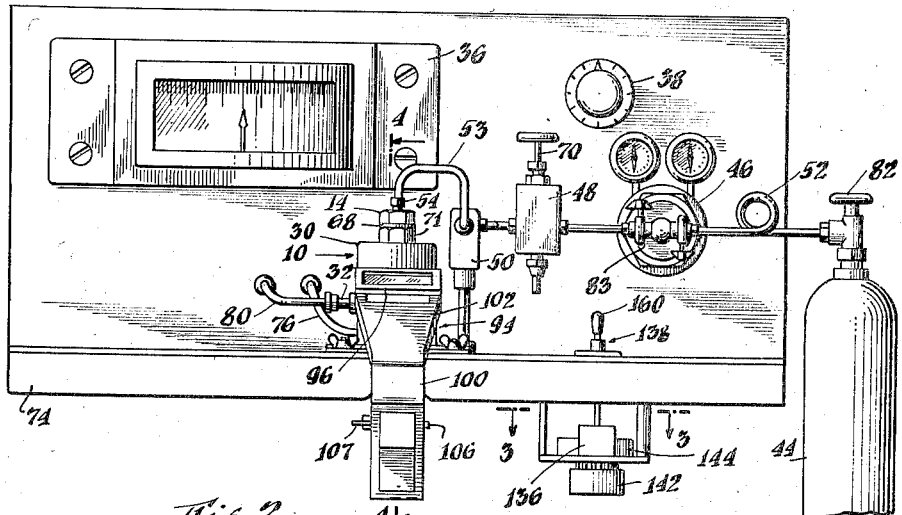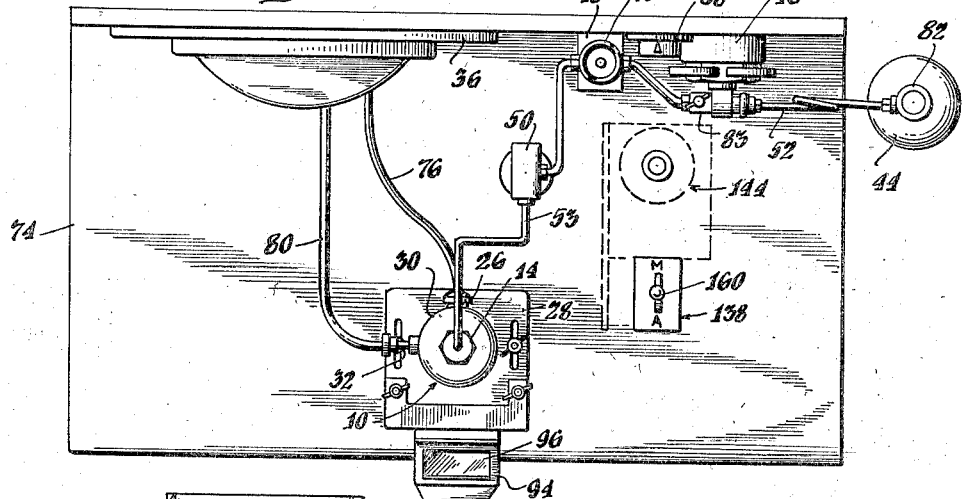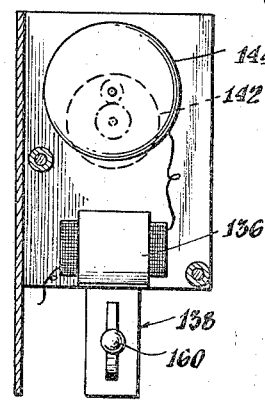

2,780,096

FLOW TESTER FOR PLASTIC MATERIALS

Aubrey E. Noble, Plainfield, Charles F. Anness, Woodbridge, Joseph B. Hyman, Plainfield, and Robert W. Raetz, Westfield, N. J., assignors to Catalin Corporation of America, a corporation of Delaware Application July 1, 1954, Serial No. 440,702

6 Claims. (Cl. 73—150)

This invention relates to an apparatus for determining the flow characteristics of plastic materials.

As is known, the way in which plastic materials can be extruded and molded is determined to a large extent by the flow characteristics of the material. For example, the amount of heat and pressure required for forcing the material into a mold and in and around the cores of the mold and the period of time required for a molding cycle are all directly related to the flow characteristics of the material. Accordingly, in order to select the right plastic material for a given mold and operation, it is important to have accurate data on the flow characteristics of the material.

In accordance with the present invention, accurate flow data is achieved under conditions simulating those actually present in commercial molding operations. This is done by causing a test sample of the plastic material to flow through a small orifice under carefully controlled conditions of heat and pressure. The amount of material passing through the orifice in a given period of time is recorded and by extruding the material at different temperatures and pressures a family of curves may be plotted giving a picture of the flow characteristics of the material. An important feature of our flow tester is that measurement of flow of the plastic material is carried out by mechanical means which eliminates human error and give exceptionally accurate flow data.

These and other advantages of our invention may be readily understood by reference to the accompanying drawings in which Fig. 1 is a front elevational view of the flow tester of our invention;

Fig. 2 is a top view of the flow tester of Fig. 1;

Fig. 3 is a schematic view of the timing mechanism taken on line 3—3 of Fig. 1;

Fig. 4 is a sectional view of our flow tester taken on line 4—4 of Fig. 1;

Fig. 5 is a sectional view taken on line 5—5 of Fig. 4;

Fig. 6 is a sectional view taken on line 6—6 of Fig. 4 and

Fig. 7 is a schematic diagram of the electric wiring system for our flow tester.

Referring to Fig. 4 of the drawings, rheometer or testing tube 10 has a hollow cylindrical chamber 12 which is closed by means of a screw cap 14 (later described). The bottom of chamber 12 is in the general form of a cone 16 which terminates in a small orifice 18 about one-quarter inch long and about forty-thousandths of an inch in diameter. The sample 19 of plastic material to be tested is placed in chamber 12 and forced through orifice 18 by applying heat and pressure to the material.

Heat is applied by means of a heating unit 20 which includes a metal tube 22, preferably made of copper, surrounded by a suitable electric heating element 24 which may be made up of a number of strands of Nichrome wire 25 connected to an electric socket 26 in one side of the unit. Heater tube 22 is positioned in a base plate 28 and surrounded with insulating material 29, such as asbestos, and the whole is encased in a metal casing or cover 30. A thermocouple well 32 (Fig. 5), which terminates just short of the surface of the inside wall of tube 22, carries a thermocouple 34 for measuring the temperature of the inside wall of the tube. Thermocouple 34 is connected in conventional manner with a heat control unit 36, such as the "Wheelco" instrument shown in Fig. 1 which controls the flow of electrical energy to heater element 24 and thereby maintains tube 22 at a predetermined temperature as set on the "Wheelco" instrument. A rheostat 38 positioned in the outside power line (not shown) to the "Wheelco" instrument controls the voltage load on the instrument. Since the "Wheelco" instrument is a commercial unit readily available on the open market, its construction will not here be described in detail.

Pressure is applied to the sample of plastic material by means of a piston head or ram which may be in the form of the brass plug 42 shown in Fig. 4. The brass plug is just large enough to make a snug sliding fit in chamber 12 of rheometer 10 and the plastic material is made to extrude through orifice 18 by supplying gas under pressure to the top of the plug. Plug 42 distributes the gas pressure evenly over sample 19 of plastic material. The gas pressure system shown (Fig. 1) includes a storage cylinder 44, a gas pressure regulator 46, a blow-off device 48 and a junction box 50. Gas is conducted from storage cylinder 44 through regulator 46, blow-off device 48 and into junction box 50 by means of metal tubing 52, preferably stainless steel tubing which is provided with suitable pressure fittings for connecting the units together. From junction box 50 the gas flows to rheometer 10 through a section of metal tubing 53 which is provided with suitable pressure fittings for connecting the junction box with the rheometer. Referring to Fig. 4 the pressure fitting for screw cap 14 of rheometer 10 comprises a hollow steel plug 54 which is screwed into well 60 of cap 14. Screw cap 14 is also in the form of a hollow steel plug and it is screwed into well 66 of rheometer 10. A lead washer 68 is preferably inserted between screw cap 14 and rheometer 10 in order to insure a tight seal against loss of gas pressure. The remaining fittings for connecting the pressure system units together are commercial items readily available on the open market. The type of pressure regulator shown at 46 is a Victor Gas-O-Dome regulator which as is known may be set for delivering gas under any desired pressure up to the maximum pressure of cylinder 44. Ordinarily the system is made to withstand a pressure of about five hundred pounds per square inch, but the unit may of course be made to withstand higher operating pressures if desired. Blow-off device 48 is also a conventional unit which includes a screw type valve 70. When valve 70 is screwed down into the unit, gas from cylinder 44 passes through the blow-off device to rheometer 10. When valve 70 is opened the valve seals off the supply of gas from cylinder 44 and opens the interior of rheometer 10 to the atmosphere. The gas employed is of course inert and it does not react with the plastic material under test. In general, nitrogen gas is excellent for our purpose.

In extruding plastic material to test its flow characteristics it is extremely important that the test be carried out under uniform conditions of temperature and pressure. Any substantial fluctuation in temperature or pressure affects extrusion rate and gives false readings and unreliable results. Our electric heating system and gas pressure system are particularly effective for controlling temperature and pressure and this enables us to achieve extremely accurate flow data.

For convenience of operation the above-described units may be set up on a table 74 as shown in Fig. 1. Operation is as follows: A sample 19 of plastic material to be tested is inserted in chamber 12 of rheometer 10 and the rheometer is then inserted in tube 22 of heating unit 20 where it makes a snug sliding fit and is held by means of collar 71 at the top of rheometer 10 which rests on top of the heating unit. Brass plug 42 is placed on top of sample 19 and then lead washer 68 is placed over well 66 of rheometer 10 and cap 14 is screwed down tight into the well. The rheometer assembly is completed by screwing plug 54 into well 60 of cap 14. This connects the rheometer with junction box 50 of the gas pressure system. Electric cord 76 from the "Wheelco" instrument is then plugged into socket 26 of heating unit 20 and thermocouple 34 is inserted into its well 32 of heating unit 20. The thermocouple is connected in conventional manner to the "Wheelco" instrument by electric cord 80. Valve 82 of cylinder 44 is now opened to supply gas to regulator 46, but valve 83 of the regulator is closed, blocking the gas off so that sample 19 of plastic material is held under normal atmospheric pressure. The "Wheelco" instrument is then set at the desired operating temperature, for example, 350° F., and electric power is turned on. Since rheometer 10 is at room temperature the "Wheelco" instrument is calling for full power and initial heating may be speeded up by cutting down the resistance of rheostat 38. In this connection it is to be noted that for best results we calibrate the "Wheelco" instrument to read the temperature inside chamber 12 since this is the temperature of sample 19 under operating conditions. Calibration of the "Wheelco" instrument is done in conventional manner and will not be here described in detail. When the "Wheelco" instrument shows that rheometer 10 is approaching operating temperature, rheostat 38 is cut back to about 70 volts, which is about all the "Wheelco" instrument requires for maintaining the sample at an operating temperature of about 350° F. Ordinarily it takes about five minutes to bring rheometer 10 to operating temperature but the unit is held at operating temperature for another thirty minutes so that sample 19 will heat up to operating temperature. As soon as the thirty-minute waiting period is up, valve 83 on the delivery side of regulator 46 is slowly opened until the desired gas pressure on the system is obtained. By opening valve 83 gas pressure is applied on top of plug 42 and the softened plastic material of sample 19 is forced to move down in rheometer 10 as a unitary body whereby the material is forced to flow through orifice 18 in the bottom of rheometer 10 in a continuous stream.

Flow data on the plastic material is now recorded. This is done by recording the period of time required for extruding a given length of strand 87 of plastic material through orifice 18. For this purpose we provide a scale 88 calibrated from zero to six inches which is positioned under rheometer 10 where it can be seen for measuring the length of the strand of extruded plastic material. When strand 87 reaches the zero point on the scale a stop watch is started and time is recorded until strand 78 reaches the 2 inch mark on scale 88 when the watch is stopped and the strand 87 is cut off above the zero point. The period of time for extruding a two-inch strand of material is recorded and when strand 87 again reaches the zero point the watch is started and the cycle repeated. Ordinarily the selected sample of material is large enough to make 15 to 20 readings. In evaluating the data the first four strands may be ignored and the time recorded on the next six strands averaged out to give the time required for extruding a two-inch strand of material under consideration. The six strands of material may then be weighed and the milligrams of material extruded per second calculated. In recording the data any length of strand may be used but we prefer to cut the strand off before it passes the five-inch mark since the weight of the material in the strand beyond five inches is such that it affects the rate of extrusion and the strand will speed up and taper down to the thickness of a hair. A two-inch strand gives a good average reading. In order to insure that different operators will sight the length of strand 87 against scale 88 in the same way, we provide a periscope 90 which is so positioned that the strand of extruded material shows against the background of scale 88. As best shown in Fig. 4 the periscope includes a main housing 94 which is closed at one end by means of a viewer glass 96 and at the other end by means of a glass panel 98. The housing is arranged so that the end portions of the housing 100 and 102, respectively, meet at an angle of about 45°. An adjustable mirror 104 positioned on rod 106 pivotally mounted near the bottom of housing 94 at the junction between end portions 100 and 102 reflects the image of the strand of material against scale 88. The mirror is adjusted so that it registers on scale 88 by turning knob 107 mounted outside the housing on rod 106. Light is provided by electric bulb 108 positioned under a frosted glass plate 110 set in the bottom of end portion 100 of housing 94.

Although we have used the flow tester as described hereinabove with satisfactory results, we have found that accuracy of data is materially improved if the strand of extruded plastic material is cut off by mechanical means. When this is done each strand of extruded material is cut off in exactly the same way each time so as not to disturb flow conditions throughout the test. A preferred form of cut-off device is illustrated in Fig. 4. As there shown, the cut-off device 116 is made up of a solenoid 118, a stationary knife 120 which is mounted on the solenoid by means of bolts 122 and a moving knife 124 slidably mounted below stationary knife 120. Each of the knife blades 120 and 124 have an opening therein 128 and 130, respectively, and when the blades are in their normal position of rest (Fig. 4) these openings are in line with each other so that they provide a passageway through the knives for the strand of extruded plastic material. The moving knife 124 is attached to the solenoid slipper 132 which when electricity is momentarily supplied to the solenoid is moved to the left (Fig. 4) and into the solenoid. As a result, knife 124 moves to the left so that opening 130 slides under the solid portion of knife 120 to cut off the strand of extruded plastic material, guillotine fashion. Spring 134, which resists movement of solenoid slipper 132 to the left, returns moving knife 124 and solenoid slipper 132 to their normal position of rest. The cut-off device 116 is of course mounted below rheometer 10 in position where the strand of extruded plastic material will pass through openings 128 and 130. If desired, the cutting edges of the knives may be sharpened to improve their cutting action. For best results, the moving knife 124 should be positioned below stationary knife 120. When this is done there is little, if any, disturbance of the strand of plastic material during the cutting operation. If desired, scale 88 may be mounted on the moving knife blade 124 with the zero marker a short distance below the moving blade. The cut-off device should be so positioned below rheometer 10 that a strand of material measuring two inches on scale 88 will not have a total length greater than five inches. As previously described, when the strand exceeds five inches the weight of the strand adversely affects the rate of flow.

The supply of electricity to solenoid 118 for operating cut-off device 116 is controlled by means of the electrical circuit schematically illustrated in Fig. 7. The circuit is so constructed that operation of the cutter may be fully automatic and controlled by a timing device, or semi-automatic and controlled by manually throwing a hand switch. Referring now to Fig. 7, the electric system for controlling cut-off device 116 comprises a terminal box 136 which supplies electric current from an outside line to the system, a double throw switch 138, a relay magnet 140, a synchronous motor 142 and a timer 144. All of these are commercial units readily available on the open market and their construction will not be described in detail. One side of terminal box 136 is connected to terminal 146 of solenoid 118, terminal 148 of motor 142 and terminal 150 of relay 140 by means of the electric wiring 152. Electric wire 154 from the other or second side of terminal box 136 is connected to terminal 156 of timer 144, terminal 158 of relay 140, and to lever 160 of double throw switch 138. Terminal 162 on one side of switch 138 is connected to terminal 164 of relay 140 and to terminal 165 of timer 144 by means of wire 166. The second terminal 168 on the other side of double throw switch 138 is connected to terminal 170 of motor 142 by means of wire 171. The circuit is completed by connecting terminal 172 of relay 140 to terminal 174 of solenoid 118 by means of wire 176. As can be readily understood by examination of the electric system relay magnet, 140 serves as a control valve for the system and solenoid 118 will only be actuated when electricity is made to flow through relay 140.

For fully automatic operation of cut-off device 116, lever 160 of double throw switch 138 is moved to the left out of its neutral position and into contact with terminal 168. The construction of switch 138 is such that lever 160 will maintain its contact with terminal 168 until it is returned to the neutral position by hand. Since lever 160 is in contact with terminal 168, electric current flows from terminal box 136 to electric motor 142 and then back to terminal box 136 by means of wire 152. This energizes synchronous motor 142 which is connected by suitable gearing (not shown) to the wiping contacts 184 of timer 144. The contacts rotate and at predetermined intervals of time (for example, thirty seconds) contacts 184 momentarily close the gap between terminals 156 and 178 of timer 144. When the gap between these terminals is closed, electric current flows from terminal box 136 through magnet 151 of relay 140 by means of wires 154, 166 and 152. As a result, the relay magnet is energized to close the gap between contacts 182 and 183. Electric current then flows from terminal box 136 through solenoid 118 and then back to the terminal box by means of the closed contacts 182 and 183 and wires 154, 176 and 152. Solenoid 118 is thereby actuated, moving slipper 132 to the left of Fig. 4 to cut off the strand of extruded plastic material as previously described hereinabove.

Semi-automatic operation of cut-off device 116 is carried out by manually throwing lever 160 of double-throw switch 138 into contact with terminal 162. As soon as lever 160 contacts terminal 162 it is released and since the lever is spring-loaded (spring not shown) it immediately returns to the neutral position as shown in Fig. 7. When contact is established with terminal 162, electric current flows through magnet 151 by means of wire 166 and then back to terminal box 136 through wire 152. This closes the gap between contacts 182 and 183 and as previously described it also energizes solenoid 118 to actuate cut-off device 116. The electric system for operation of cut-off device 116 is mounted on table 74 by any convenient means.

Actual testing under semi-automatic conditions proceeds as follows: After gas pressure is applied to rheometer 10, as described hereinabove, the operator stations himself at periscope 90 where he can watch the strand of plastic material as it is extruded from orifice 18 of rheometer 10. When the strand reaches the zero point on scale 88 a stopwatch is started and when the strand reaches the two-inch marker on the scale the watch is stopped and at the same time the operator quickly moves lever 160 out of its neutral position and into contact with terminal 162 of double throw-switch 138. The lever is immediately released and, being spring-loaded, it returns to its neutral position. As a result, solenoid 118 is energized to cut off the strand of extruded plastic material. The stopwatch time is recorded and when the strand of material again reaches the zero point on scale 88 the operator starts the watch and the cycle is repeated until the sample is used up or until 15 to 20 readings are recorded.

Fully automatic operation is carried out as follows: After gas pressure is applied to rheometer 10 the operator cuts off the first two-inch strands of plastic material by moving lever 160 out of its neutral position into contact with terminal 162 of double throw-switch 138. Immediately thereafter lever 160 is moved into contact with terminal 168 of the double throw-switch. It will be understood that in this case lever 160 remains in contact with terminal 168 and it does not return to the neutral position as is the case when lever 160 is brought into contact with terminal 162. As previously described, electric current now flows through motor 142 which in turn causes the wiping contacts 184 of timer 144 to rotate and as a result cut-off device 116 is automatically actuated about every thirty seconds to cut off a strand of extruded plastic material. With full automatic operation it is not necessary for the operator to make a record of time. After the sample is used up, lever 160 is returned to its neutral position. The rate of flow may be calculated as follows: The first four strands of material are discarded and the next six strands are weighed up in an analytical balance. The weight in milligrams of this material is then divided in this case by 180 seconds to get the milligrams of material extruded per second. Of course, any number or all of the strands of extruded material may be weighed up and included in the test, if desired. After a test is completed the rheometer 10 is allowed to cool off and valve 70 of blow-off device 48 is then opened to release the pressure on the rheometer. Rheometer tube 10 may then be removed from heating unit 20 and cleaned for subsequent use.

In operating our flow tester we have achieved excellent results by making up the material to be tested into a one-half square test bar about 5 inches long. This bar is cut up into three equal sections and each section is tested and the results of the three tests are averaged together. Each section of a test bar will give about twenty to thirty strands of extruded material about two inches long and, as previously described, data on the first four strands of material from each section is ignored and the data on the next six strands is averaged for the particular section of the bar being subjected to test. Several test bars of the same material may be tested at different temperatures and pressures and a series of curves may be plotted from the results giving a complete picture of the flow characteristics of the material. Alternatively, tests may be conducted at standard temperatures and pressures in connection with production control to insure delivery to customers of plastic material of uniform flow characteristics.

It will be understood that we use the term "rheometer" herein as it is used in the plastic art to describe a device for measuring the flow properties of plastic material.

It will be further understood that it is intended to cover all changes and modifications of the preferred embodiment of our invention herein chosen for the purpose of illustration which do not constitute departures from the spirit and scope of our invention.

What we claim is:

1. A testing device for measuring the flow characteristics of plastic materials comprising a rheometer tube with an orifice therein for holding a sample of plastic material to be tested, an electric heating unit for heating the rheometer tube and sample to a predetermined temperature, means for applying gas under pressure to the softened plastic material to force the material to extrude as a strand through the orifice at the bottom of the tube, and means for cutting off the strand of extruded plastic material, said cutting means being operative at predetermined intervals of time to cut off the length of plastic material extruded during such predetermined time interval whereby the rate of flow of the material may be measured.

2. A structure as specified in claim 1 in which the means for cutting off the strand of plastic material includes a cut-off device comprising a stationary knife in the general form of a flat plate having an opening therein and a movable knife in the general form of a flat plate having an opening therein which is slidably mounted in face-to-face relationship with said stationary knife, each of said openings being so positioned in the knives that the openings coincide and form a passageway through the knives for the strand of extruded plastic material, means for sliding the moving knife along the surface of the face of the stationary knife, said knives being positioned below the orifice of the rheomatic tube where the strand of extruded plastic material will pass through said passageway, whereby the strand of extruded plastic material may be cut off guillotine fashion when the moving knife is made to slide along the surface of the stationary knife to close the passageway through the knives formed by the openings therein.

3. A structure as specified in claim 1 in which the means for cutting off the strand of extruded plastic material includes a solenoid, a stationary knife mounted on the solenoid, a movable knife mounted on the slipper of the solenoid, each of said knives having an opening therein, which openings coincide with each other to form a passageway through the knives for the strand of extruded plastic material when the solenoid slipper is in its normal position of rest, electric means for actuating the solenoid whereby the slipper is made to slide into the body of the solenoid and close the passageway to cut off the strand of extruded plastic material, and spring means which resist movement of said solenoid slipper and returns it to its normal position of rest after the strand of extruded plastic material is severed.

4. A structure as specified in claim 1 in which the means for cutting off the strand of extruded plastic material includes a guillotine type cutter for severing the strand of plastic material, and an electric system for operating the cutter including a solenoid for acuating said cutter to sever the strand of plastic material, an electric circuit for energizing said solenoid including a timing device having wiping contacts which rotate and make and break the circuit at predetermined periods of time to actuate the solenoid for cutting off the strand of extruded plastic material, and a synchronous motor in said circuit for rotating the wiping contacts of said timer.

5. A testing device for measuring the flow characteristics of plastic materials comprising a rheometer tube with an orifice therein for holding a sample of plastic material to be tested, electric means for heating the tube to a predetermined temperature to soften the plastic material, means for applying gas under pressure to the softened material whereby the material is forced to extrude through the orifice at the bottom of the tube and a guillotine type cutter positioned below said orifice adapted to cut predetermined lengths off the strand of extruded plastic material whereby the rate of flow of plastic material extruded through the orifice may be measured.

6. A structure as specified in claim 5 including electric means for operating the cutter.

References Cited in the file of this patent

UNITED STATES PATENTS

| | | |
|---|---|---|
| 1,831,980 | Teschner | Nov. 17, 1931 |
| 2,045,548 | Dillon et al. | June 23, 1936 |
| 2,104,163 | McJunkin | Jan. 4, 1938 |
| 2,375,034 | Semchysen | May 1, 1945 |
| 2,436,317 | Manjoine | Feb. 17, 1948 |
| 2,503,660 | Exline et al. | Apr. 11, 1950 |

FOREIGN PATENTS

| | | |
|---|---|---|
| 443,398 | Great Britain | Feb. 27, 1936 |
| 681,197 | Great Britain | Oct. 22, 1952 |